Dec. 28, 1943.  W. J. COULTAS ET AL  2,337,592
HARVESTER
Filed March 20, 1942  9 Sheets-Sheet 1

FIG. I

INVENTORS
Wilbur J. Coultas
Russell L. Dort
BY
ATTORNEYS

Dec. 28, 1943.   W. J. COULTAS ET AL   2,337,592
HARVESTER
Filed March 20, 1942      9 Sheets-Sheet 3

INVENTORS
Wilbur J. Coultas
Russell L. Dort
BY
ATTORNEYS

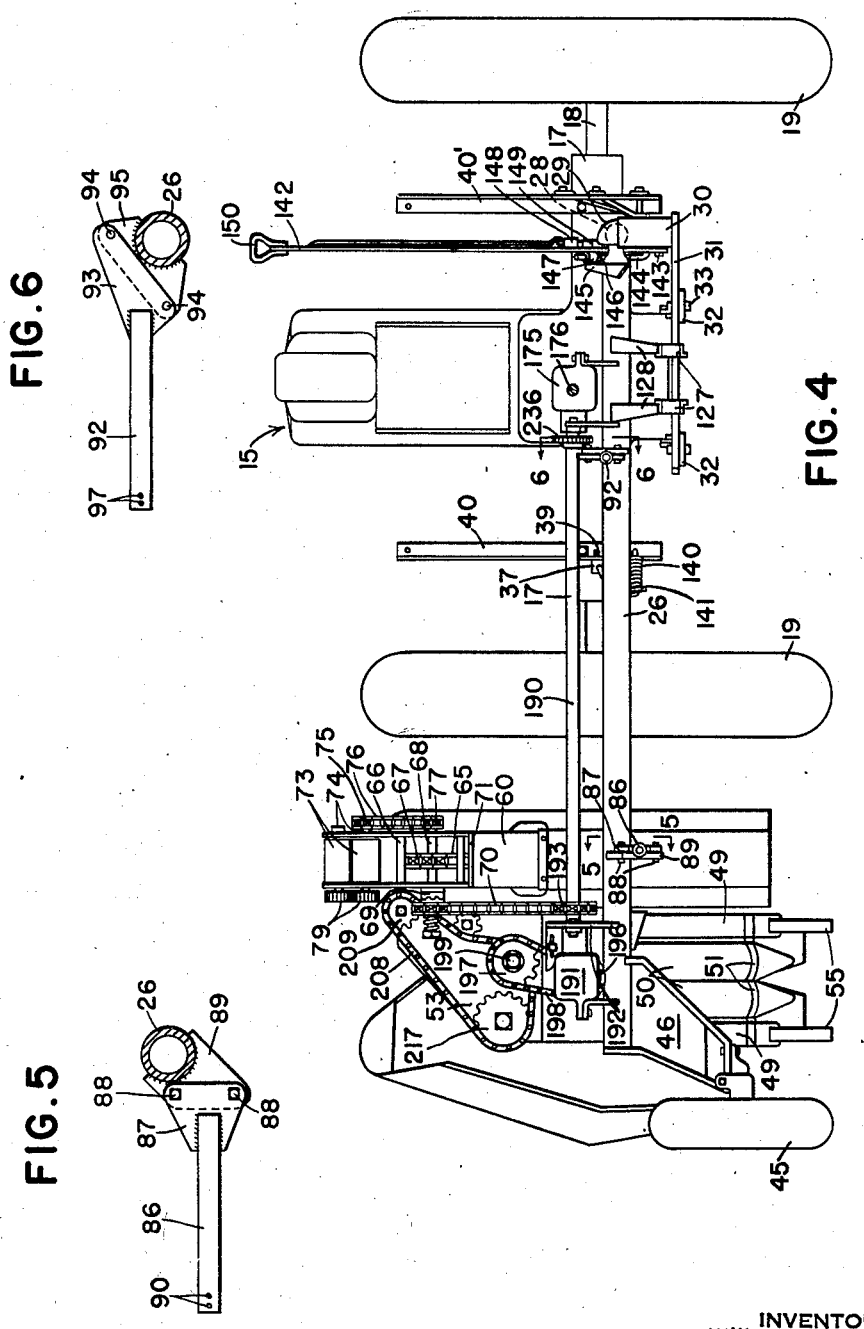

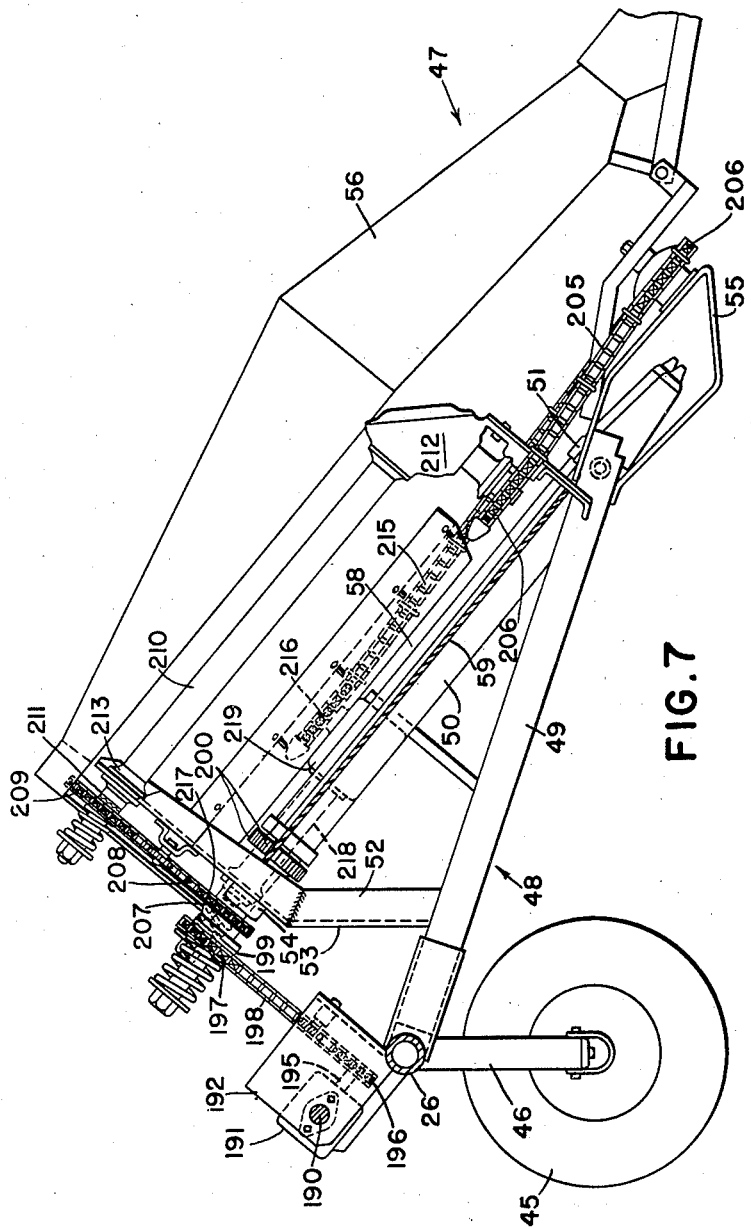

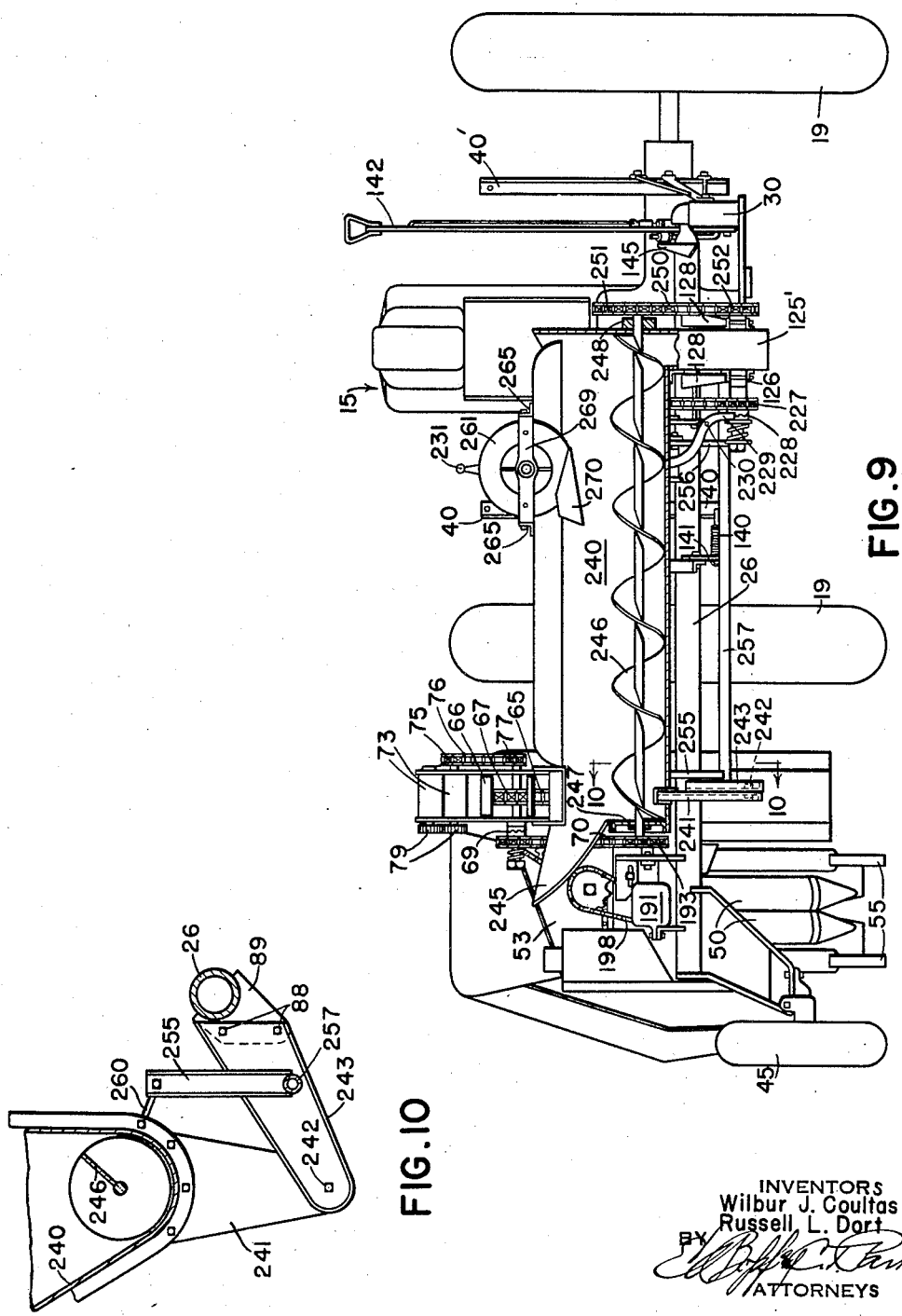

Dec. 28, 1943.  W. J. COULTAS ET AL  2,337,592
HARVESTER
Filed March 20, 1942   9 Sheets-Sheet 8

INVENTORS
Wilbur J. Coultas
Russell L. Dort
BY
ATTORNEYS

Dec. 28, 1943. W. J. COULTAS ET AL 2,337,592
HARVESTER
Filed March 20, 1942 9 Sheets-Sheet 9

INVENTORS
Wilbur J. Coultas
Russell L. Dort
BY
ATTORNEYS

Patented Dec. 28, 1943

2,337,592

UNITED STATES PATENT OFFICE 2,337,592

HARVESTER

Wilbur J. Coultas, Moline, Ill., and Russell L. Dort, Davenport, Iowa, assignors to Deere & Company, Moline, Ill., a corporation of Illinois Application March 20, 1942, Serial No. 435,494

43 Claims. (Cl. 56—18)

The present invention relates generally to harvesters and more particularly to machines for harvesting corn. Corn harvesters fall within three general classes, namely, those which are mounted directly upon the tractor, those which are carried on their own wheels and are connected to a tractor merely by a drawbar, and the semi-mounted type which are partly carried by the tractor and partly on their own wheels. The machines of the first class, tractor mounted harvesters, have the advantage that since they are carried entirely on the tractor, there is considerable saving due to the elimination of ground wheels, draft members, etc. As a practical matter, however, since this type of machine can be mounted only on the tractor for which it is designed, the market for such machine is limited to those purchasers who own tractors of that particular make. Corn harvesters of the second type, which are towed behind the tractor, require their own supporting frame, ground wheels, rubber tires, and draft frame, which adds to the cost but makes them universally applicable to any tractor having sufficient power to pull them. The third type of corn harvester, namely, the semi-mounted type, provide a compromise between the tractor mounted and the towed types of harvesters, as they require considerably less frame and draft structure than the towed type, but can be designed to attach to almost any commercial form of tractor, with the addition of a few alternative connecting pieces. Furthermore, the semi-mounted harvester can be more easily connected to the tractor and disconnected therefrom than the tractor mounted harvester, and the machine can be arranged so that the operator can obtain a better view of the various parts of the mechanism than in either of the other two types of harvester. Therefore, it is with this third class of machines, the semi-mounted type of harvester, that the present invention is more particularly concerned, and the principal object of our invention has to do with the provision of a novel and improved harvester, which is simple, inexpensive and light in weight, which can be operated in connection with some of the smaller sizes of tractors now on the market, but which is strong, durable, and capable of operating efficiently under difficult harvesting conditions.

In the accomplishment of this object, we have employed a single transversely disposed beam as a supporting frame for the implement, the inner end of the beam being carried on the rear of the tractor and the outer end extending laterally beyond one of the tractor wheels and having a single ground wheel for support. Since it is a further object of our invention to simplify the draft connections and to facilitate connection with various types of tractors, we have mounted the inner end of the main draft beam on the tractor by means of a universal joint connection, with a second draft link connected intermediate the ends of the beam and connected with the rear end of the tractor, thus providing for vertical swinging movement of the draft beam about the universal joint and also for a limited amount of angular movement of the beam about its own major axis, but preventing rearward swinging movement of the beam relative to the tractor. These two connections are the sole means for transmitting draft to the implement, thereby eliminating any external connections to the forward portion of the tractor, as is found in the prior art, thus simplifying the machine and making it universally adaptable to many different kinds of tractors.

The harvesting mechanism includes a gatherer unit fixed rigidly to the beam outside of the tractor wheel, thus accomplishing a further object of our invention, namely, the provision of a corn harvester in which the harvesting mechanism is within convenient view of the operator of the tractor.

Still another object of our invention is concerned with the provision of simplified control means for raising and lowering the gatherer arms, and this is accomplished by providing a lever adjacent the universal joint connection, for angularly moving the beam, stressing the latter in torsion to raise the harvesting unit. This eliminates the necessity for any additional lifting mechanism out at the side of the tractor.

The object of providing a simple and inexpensive machine is further carried out by disposing the husking unit transversely behind the draft beam and supporting the unit on a pair of arms fixed to the beam and extending rearwardly therefrom, with a wagon elevator extending rearwardly from the inner end of the husking box. Thus, the elevator and husking box tend to balance the weight of the harvesting unit about the axis of the beam, and thus minimizing the size of the counterbalancing spring.

Inasmuch as some farmers desire a corn picker of minimum cost, and are satisfied with the amount of husking which is accomplished by the snapping rolls of the implement, it is another object of our invention to simplify the manufacture and assembly of the implement by providing a common mounting means on the transverse draft beam for optionally receiving either a husking box or a conveyor trough interconnecting the harvesting unit with the wagon elevator. For those operators who wish to shell their corn at the time of harvesting, it is a further object of our invention to provide as an alternative to the conveyor and the husking box, a corn sheller, which is easily interchangeable with the other two devices, and which fits on the common mounting means on the transverse draft beam.

Still another object of our invention is concerned with the provision for conveniently connecting a wagon to the rear of the tractor in a position to receive harvested corn from the wagon elevator, the wagon draft means being arranged so that although the draft force is not transmitted through the frame of the implement, the draft means is a part of the structure and remains with the implement when the latter is disconnected from the tractor, thus minimizing the number of separate parts which must be collected when it is desired to mount the implement on the tractor.

A further object relates to the provision of a snapping unit in which the number of broken pieces of stalks carried to the husking or shelling mechanism is maintained at a minimum.

A further object relates to the provision of a novel transport truck for supporting the implement when it is detached from the tractor, which is simple and inexpensive, but which holds the various parts of the implement in a position in which they can be easily connected to the tractor, and which also facilitates the raising of the draft beam off the ground in case the beam is laid on the ground after disconnection from the tractor.

These and other objects and advantages of our invention will be apparent to those skilled in the art after a consideration of the following description, in which reference is had to the drawings appended hereto, in which Figure 1 is a plan view of a corn harvester of the picker husker type, mounted on the rear end of the tractor;

Figure 4 is a rear elevational view of the implement with the husking box and wagon elevator removed;

Figure 8:
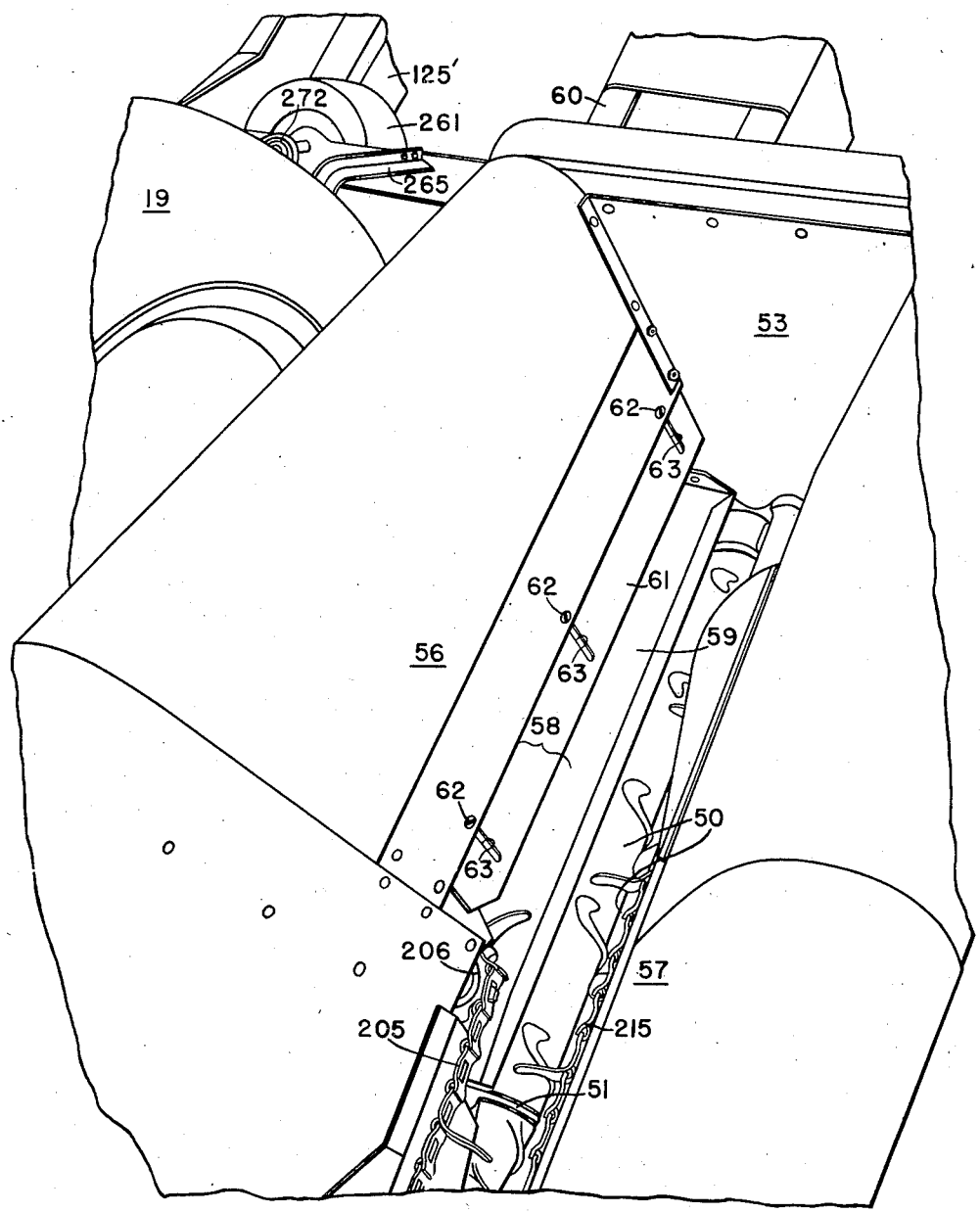
Figure 11:
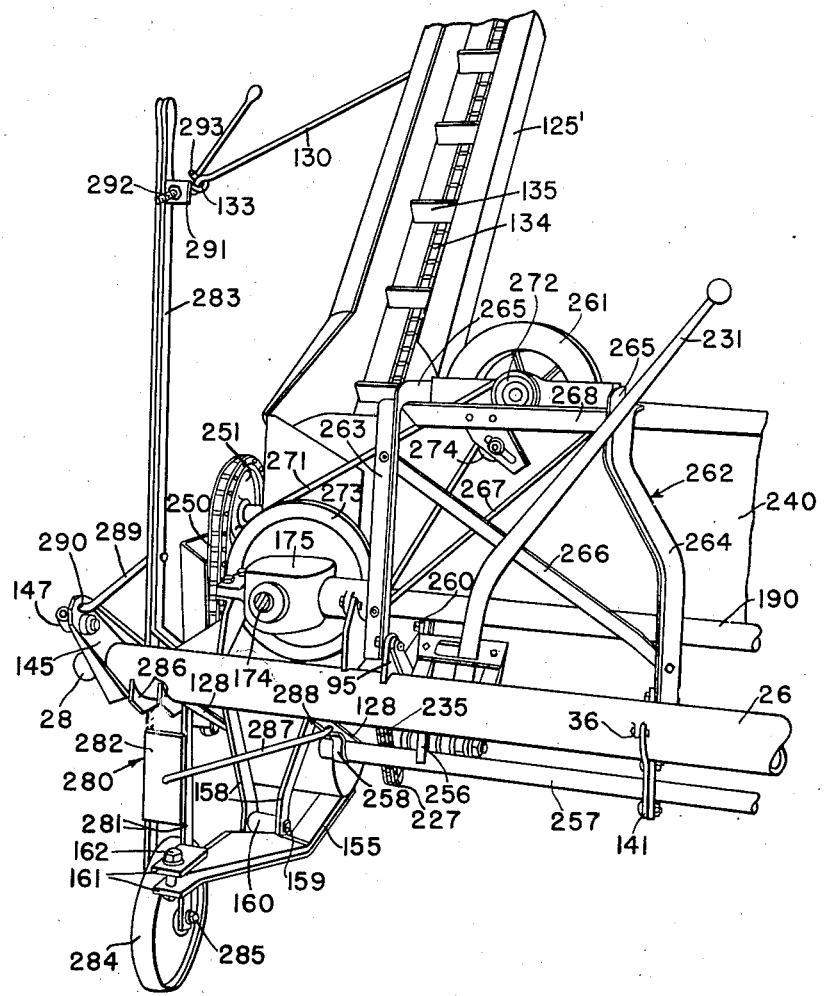
Figure 13:
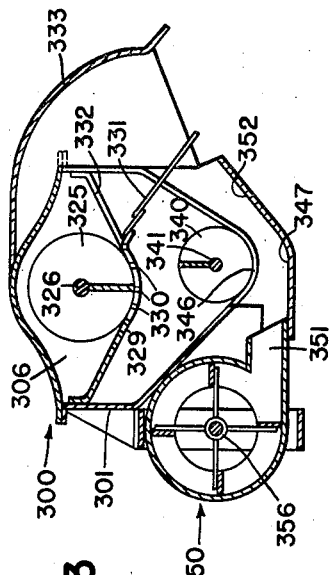
Figure 12:
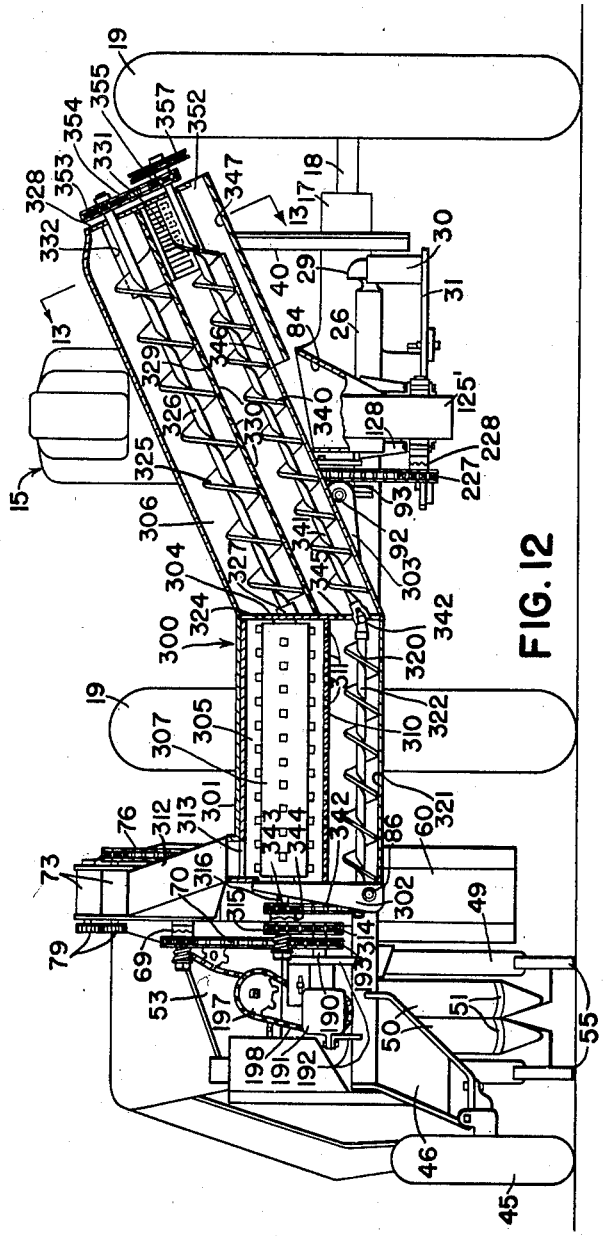

Figures 5 and 6 are sectional elevational views taken along lines 5—5 and 6—6 of Figure 4, showing the supporting arms for the husking box;

Figure 7 is a side elevational view of the snapping unit frame and mechanism;

Figure 8 is a perspective view looking down into the harvester unit at the snapping rolls;

Figure 9 is a rear elevational view of a harvester in which the husking box has been replaced with an auger conveyor in a trough, the latter being shown in section and the wagon elevator being broken off to show the details more clearly;

Figure 10 is a sectional elevational view taken along a line 10—10 of Figure 9;

Figure 11 is a fragmentary perspective view of the implement of Figures 9 and 10 removed from the tractor and supported on a special transport truck;

Figure 12 is a rear elevational view of a harvester in which the husking box has been replaced with a sheller, the latter being shown in section, and the wagon elevator being broken away; and Figure 13 is a sectional view taken along a line 13—13 of Figure 12.

Referring now to the drawings, reference numeral 15 indicates in its entirety a tractor of a conventional type, comprising a central longitudinally extending body 16 having laterally outwardly extending rear axle housings 17, within which are journaled a pair of drive axles 18, which are carried on traction wheels 19, respectively, the latter being driven through conventional mechanism by means of an engine carried on the tractor body 16. The tractor is also provided with an operator's seat 20, supported on the rear end of the tractor body between the traction wheels 19. The tractor 15 is also provided with the usual draft frame 21, rigidly carried beneath the rear end of the tractor body 16, and a splined power take-off shaft 22, which extends rearwardly from the rear end of the body and is driven in a conventional manner from the tractor engine.

The corn harvester, indicated by the reference numeral 25, includes a single frame member or beam 26, preferably in the form of a pipe of substantial diameter, disposed transversely directly behind the tractor and extending from a point between the rear tractor wheels 19 laterally beyond one of the latter. The inner end of the beam 26 is supported on the rear end of the tractor by draft means including a universal joint 27 comprising a ball member 28, movable within a socket member 29. The socket member 29 is fixedly supported on a structural arm 30, which is disposed longitudinally of the tractor and is fixed at its forward end to a transverse frame bar 31, bolted as at 33 to a pair of arms rigidly connected by bolts 34 to the tractor draft frame 21 and extending rearwardly therefrom. A second draft connection in the form of a rod or link 35 is disposed intermediate the ends of the beam 26, its rear end being hooked into a lug 36, which is welded to the beam 26, and the forward end of the rod 35 is connected to an angle clip 37 by a pair of nuts 38 engaging the forward threaded end of the rod 35. The angle clip 37 is pivotally connected by means of a bolt 39 to the flange of a vertically disposed structural angle member 40, which is bolted to the implement supporting boss on the rear face of the tractor axle housing 17. Thus, it is evident that the beam 26 is free to rotate about its major axis within the ball and socket joint, through a limited angular range, and is also free to swing vertically about the universal joint 27, but the draft link 35 prevents the beam 26 from swinging rearwardly.

The outer end of the beam 26 is supported on a ground wheel 45, which is journaled on a downwardly extending leg 46, fixed to the outer end of the beam 26. As the tractor moves forwardly, the beam 26 is maintained by the draft connections in a position substantially perpendicular to the line of advance, but is free to swing vertically about the universal socket connection 27 to permit the wheel 45 to follow the contour of the ground. Inasmuch as the wheel 45 is not directly coaxial with the tractor wheels 19, there is a slight tendency to drag the wheel 45 when making a turn, but experience has proved that, with a rubber tire on the wheel 45, no difficulty is encountered in making turns.

The harvesting unit 47 includes a rigid frame 48 (Figure 7) comprising a pair of forwardly extending frame members 49 which are rigidly connected at their rear ends to the transverse beam 26 and extend forwardly in laterally spaced relation to each other as cantilever supporting beams, as best shown in Figures 4 and 7. A pair of forwardly and downwardly inclined cooperative snapping rolls 50 are journaled near their forward ends in bearings 51 of any conventional type, supported on the forward ends of the longitudinal frame members 49. The rear ends of the snapping rolls 50 are journaled in a generally vertical framework 52, which is fixed to the longitudinal frame members 49 and extends upwardly therefrom. The framework 52 includes a rear end plate 53, in which the rear bearings 54 for the snapping rolls 50 are mounted, as well as other parts of the driving mechanism as will be explained later. A ground engageable runner 55 is fastened at the forward end of each of the frame members 49 for the purpose of preventing the tapered forward ends of the snapping rolls from digging into the ground.

A pair of sheet metal walls 56, 57 extend upwardly from opposite sides of the pair of snapping rolls 50, and curve upwardly and outwardly to form gatherers for receiving and guiding the corn stalks into the snapping rolls. A longitudinally extending oblong aperture 58 is provided in the lower rear portion of the inner side wall 56 adjacent the snapping rolls for the purpose of discharging the snapped ears into a chute 59, over which the ears slide into a conveyor trough 60. Positioned within the aperture 58 is a baffle plate 61 which lies flat against the inner side of the wall 56 and extends below the lower edge of the latter to cover a portion of the aperture 58. The baffle 61 is slidable vertically against the wall 56 to increase or decrease the height of the aperture and is secured in any position of adjustment by means of a plurality of bolts 62, which extend through suitable apertures in the side wall 56 and through aligned slots 63 in the baffle plate 61. When the machine is operated in a field in which the yield is heavy and the cornstalks are tough and do not break off easily, the baffle plate 61 is fixed at its highest position of adjustment, in which the size of the opening 58 is at a maximum, but when operating in a field in which the stalks are brittle and tend to break off at the time of the snapping operation, and the yield is comparatively low, the baffle plate 61 should be slid downwardly to its lowest position of adjustment in which the size of the opening 58 is at a minimum, to prevent the broken pieces of cornstalk from sliding into the conveyor trough 60 with the ears. Intermediate conditions can be taken care of by placing the baffle 61 in any intermediate position of adjustment.

The ears of corn are moved upwardly and rearwardly within the trough 60 by means of an endless chain conveyor 65 having cross slats 66 for engaging the ears. The chain 65 operates in a generally vertical plane over a pair of upper and lower sprockets, the upper sprocket 67 being mounted on a drive shaft 68 which is driven through a slip clutch 69 by means of a drive chain 70 as will be later described. The ears of corn are dropped over the rear edge 71 of the trough 60 into the husking box 72, the sides of the trough 60 being extended rearwardly and upwardly to support a pair of cooperative trash rolls 73 mounted on a pair of vertically spaced shafts 74, which are journaled in the opposite side walls of the trough 60. The lower trash roll shaft 74 is provided with a sprocket 75 which is driven by a chain 76 trained over a sprocket 77, which is fixed on the shaft 68. The two shafts 74 of the trash rolls are interconnected by a pair of intermeshing gears 79. The trash rolls 73, which are of more or less conventional design, are adapted to engage any pieces of stalk that may be carried rearwardly by the conveyor 65, and thus separate the stalks from the ears of corn and eject them rearwardly over a chute 78 to the ground.

The husking box 72 comprises a housing 83 disposed transversely behind the main draft beam 26 and is positioned with its outer end beneath the discharge end 71 of the conveyor trough 60. The housing 83 is inclined upwardly, so that the inner end is elevated to provide room beneath the housing for an elevator hopper 84, as will be later described. The outer end of the housing 83 is provided with a pair of apertured supporting ears 85, which slide over a fore and aft extending supporting pipe member 86, which is welded to a connecting plate 87, the latter being detachably connected by bolts 88 to a supporting plate 89 welded to the beam 26, as best shown in Figure 5. The housing 83 is prevented from sliding axially along the supporting pipe 86 by means of a pair of cotter pins (not shown) which are insertable through a pair of axially spaced holes 90 on opposite sides of the rearward supporting ear 85. Similarly, the inner end of the husking box is carried on a pair of fore and aft spaced legs 91, which are apertured at their lower ends to receive a supporting pipe member 92 best shown in Figure 6, which is welded to a connecting plate 93, connected by bolts 94 to a supporting plate 95, which is welded to the transverse beam 26. A pair of holes 97 is provided at the outer end of the supporting pipe 92, to receive a pair of cotter pins for securing the housing on the supporting pipe.

A pair of cooperative husking rolls 100 are disposed within the upper portion of the husking box 72 and are journaled at opposite ends thereof in the end walls 101, 102 of the housing 83. The lower part of the housing 83 is curved to provide a trough 103, within which is journaled an auger 104. The ears of corn drop from the conveyor trough 60 to the husking rolls 100 at the outer end of the latter, the upper part of the husking box being provided with outwardly flared sides 105 serving as a hopper to catch the ears. The ears are moved upwardly and laterally toward the center of the tractor by means of a pair of endless chain conveyors 106, 107, having short paddles 108 connected thereto, which serve to urge the ears inwardly to the discharge end of the husking box, which is provided with a chute 109 over which the husked ears fall into the elevator hopper 84. The husks and silks which are stripped from the ears by the husking rolls 100 are moved laterally through the trough 103 by the auger conveyor 104, and are discharged from the discharge opening 110 at the opposite end thereof onto the ground. The auger trough 103 is extended over the elevator hopper 84 and is provided with perforations 111, through which any kernels of corn carried with the husks, can drop into the hopper 84.

Any dirt that drops through the perforations 111 with the kernels of corn is blown out of the hopper by a blast of air from a fan 115, which is mounted on a U-shaped frame 116, the ends of which are apertured to receive the supporting pipe 92. A supporting rod 117 connects the other end of the frame 116 to one of the legs 91, the rods 117 being adjustably connected to the leg 91 by means of a bolt 118 which is vertically slidable within the slot in the leg, thus providing for an adjustment of the direction of the blast of air, which is conducted to the hopper by means of an exhaust duct 119.

The hopper 84 is carried on an elevator casing 125, which is provided with a pair of hubs 126 extending outwardly from opposite sides thereof at the lower end of the casing 125. The hubs are supported in recesses 127 at the ends of a pair of arms 128 rigidly fixed to the beam 26 and extending rearwardly and downwardly therefrom. The hubs 126 are retained within the recesses 127 by means of shackles 129. The elevator casing 125 extends upwardly and rearwardly from its supporting arms 128 and is free to swing vertically in a generally longitudinally extending plane, but is held in raised position by a pair of tension rods 130. The tension rods 130 are connected to the elevator casing near the upper end thereof and extend forwardly in diverging relation and are connected by means of eye bolts 131 to the upper ends of the standards 40, 40', which are bolted to the bosses on the rear of the axle housings 17 of the tractor. Compression springs 132 encircle the eye bolts 131, and cushion the elevator against shocks during movement of the tractor. Each of the tension rods 130 consists of a pair of rods connected together by a pair of interconnected eyes 133, to permit buckling whenever the elevator strikes against the edge of the wagon, which is drawn behind the tractor.

Disposed within the casing of the wagon elevator 125 is an endless chain conveyor 134 provided with transverse buckets or slats 135, engageable with the husked ears of corn to carry the same upwardly and rearwardly and discharge them into the wagon behind the tractor.

Figure 2:
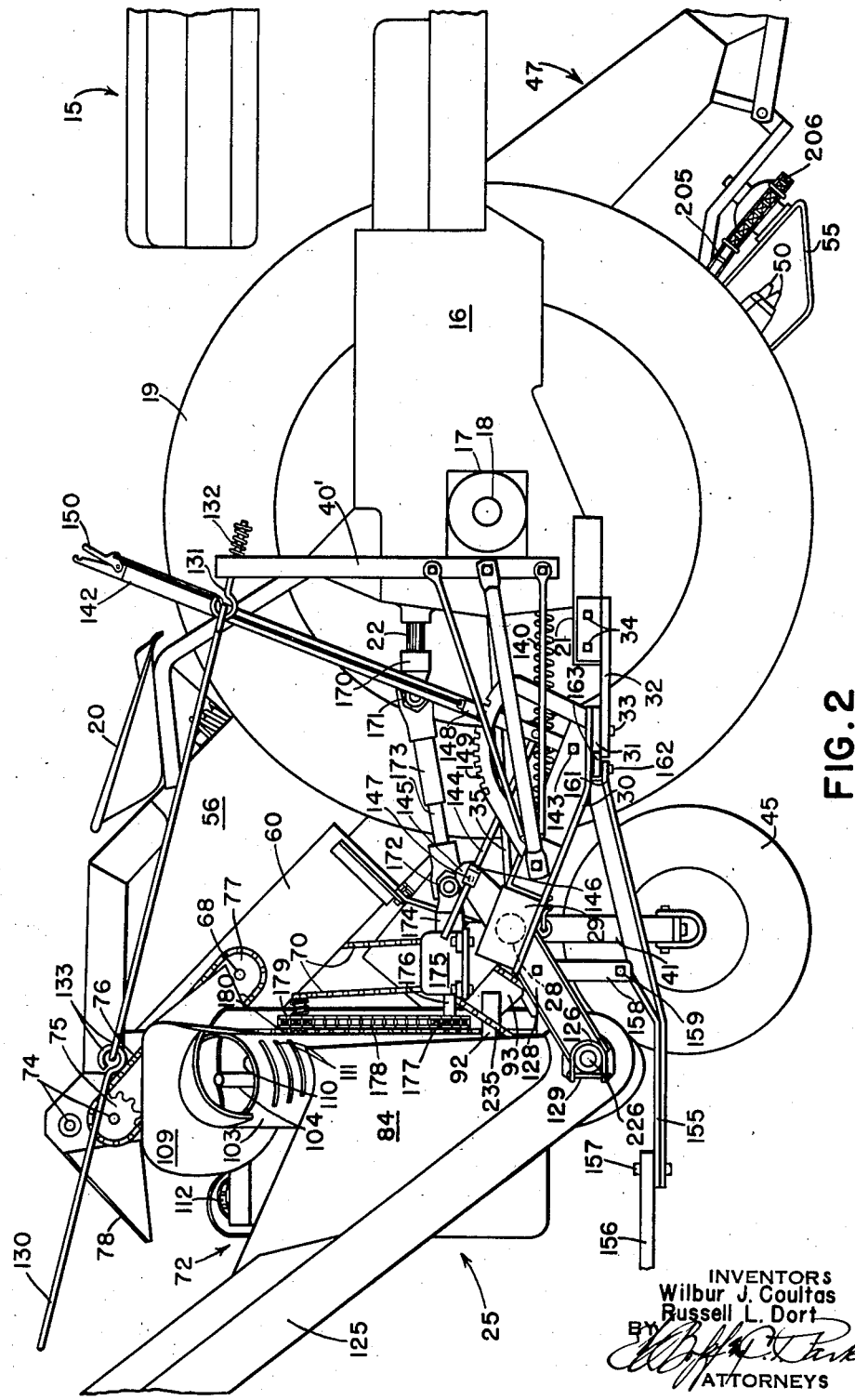
Figure 2 is a side elevational view of the harvester, with the proximate rear tractor wheel removed to more clearly show the details of the implement.
Figure 3:
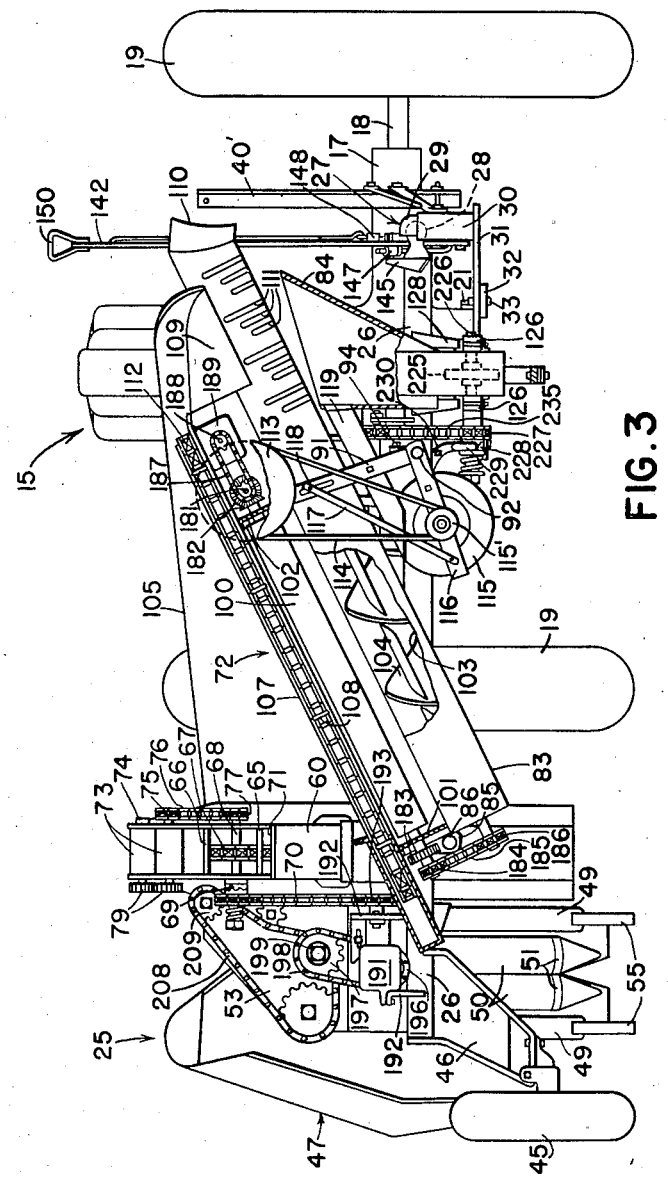
Figure 3 is a rear elevational view of the picker husker, with part of the casing of the husking box broken away to show details of the husking mechanism.

It is evident from the above description that the weight of the picker husker is divided between the ball and socket joint 27 on the rear of the tractor and the outboard wheel 45. The weight of the husking box 72 and the elevator 125 counterbalance a portion of the weight of the harvester unit 47 about the axis of the beam 26. The counterbalancing spring 140 acts in tension against the lug 141 on the lower side of the beam 26, reacting against the upright standard 40 on the rear axle housing 17. This spring tends to rotate the beam 26 in such a way as to raise the forward end of the harvester unit 47. The harvester unit 47 is raised and lowered at the option of the operator, by means of a manually actuated lever 142, pivotally connected by a bolt 143 to the rearwardly extending support 30 for the ball and socket joint 27. The lever 142 is connected by means of a push rod 144 to an arm 145, which is rigidly fixed to the inner end of the beam 26 adjacent the ball and socket joint 27. The rod 144 has a collar 146 rigidly fixed thereto, which engages a sleeve 147, pivotally mounted on the arm 145. The rod 144 extends through the sleeve 147 and is slidable thereon, thereby permitting the arm 145 to swing rearwardly when the runners 55 encounter a rise in the ground, but the collar 146 establishes a limit for the downward swinging movement of the harvester unit 147. The lever 142 is fixed in adjusted position by means of a conventional latch 148, which engages a notched sector 149 welded to the support member 30. Thus, by disengaging the latch 148 by means of the grip 150, the lever 142 may be pulled rearwardly by the operator, pushing through the rod 144 and collar 146 against the sleeve 147, and thus angularly moving the beam 26 about its major axis in a counterclockwise direction as viewed in Figure 2. The beam 26 is thus stressed in torsion to raise the forward ends of the gatherers, the effort of the operator being assisted by the tension of the counterbalancing spring 140 against the lug 141 on the lower side of the beam 26.

The wagon is drawn behind the tractor to receive corn from the elevator 125 by means of a drawbar 155, to which the tongue 156 of the wagon is connected by a suitable bolt or pin 157. The drawbar 155 is supported from the elevator supporting arms 128 by means of a pair of links 158 bolted at their upper ends to the arms 128, respectively, and swingably connected to the drawbar 155 by means of a bolt 159, which extends through a sleeve 160 welded to the top of the drawbar 155 and through aligned apertures in the lower ends of the links 158. The forward end of the drawbar 155 is provided with a pair of vertically spaced hitch plates 161 rigidly welded thereto, and connected by a bolt 162 to a lug 163 which is welded to the transverse draft member 31 and extends rearwardly therefrom.

Power for driving the snapping, husking and conveying mechanism is obtained from the power take-off shaft 22 of the tractor, and is transmitted thereto by means of a power shaft including a splined socket 170, which engages the end of the splined power take-off shaft 22 and is connected through a pair of universal joints 171, 172 and a pair of telescoping shaft members 173 of square cross section to a stub shaft 174 which projects forwardly from a gear box 175. The stub shaft 174 is connected directly with a shaft 176 projecting from the opposite side of the gear box 175, on which shaft is fixed a sprocket 177 connected by a chain 178 to a sprocket 179 (see Figure 2), which is connected through a slip clutch 180 to a shaft 181, journaled in a fore and aft extending position in the upper portion of the husking box 72. The shaft 181 is connected to one of the husking rolls 100 by means of a pair of bevel gears 182. The other husking roll is driven through a pair of intermeshing gears 183 at the opposite ends of the husking rolls 100. The husk conveyor auger 104 is driven through a sprocket 184 fixed to one of the husking roll shafts, which drives a sprocket 186 on the shaft of the auger 104 through a chain 185.

The ear conveyor chains 107 over the husking rolls 100 are driven by a shaft 188 disposed generally parallel to the shaft 181 and connected thereto through a chain 187 trained over suitable sprockets. The shaft 188 is connected to the upper sprockets 112 over which the chains 107 are trained through suitable bevel gears (not shown) disposed within a pair of gear housings 189 disposed beneath the sprockets 112, respectively. The fan 115 is also driven from the shaft 181 through a belt pulley 113, which is fixed on the rear end of the shaft 181 behind the husking box and is connected through a V-belt 114 to a pulley 115' on the fan shaft. The tension in the V-belt 114 is adjusted by first loosening the upper connection 118 of the supporting rod 117 and swinging the frame 116 about the pipe support 92.

The mechanism on the harvesting unit 47 is driven through a transversely disposed power shaft 190, supported at its inner end in the gear box 175 and driven by suitable bevel gears (not shown) within the gear box. The outer end of the power shaft 190 is journaled in a gear box 191, which is rigidly supported on a pair of plates 192 welded to the beam 26 adjacent the outer end thereof. The ear conveyor chain 65 is driven from a sprocket 193, fixed to the power shaft 190 adjacent the gear box 191, over which the drive chain 70 is trained.

The snapping rolls 50 receive power from suitable bevel gears (not shown) within the gear housing 191, which transmit power from the power shaft 190 to a stub shaft 195 (see Figure 7), projecting out of the forward side of the gear housing. The shaft 195 is connected to a sprocket 196, which drives a sprocket 197 through a chain 198. The sprocket 197 is connected through a suitable slip clutch 199 to the shaft of the inner snapping roll, while the outer snapping roll 50 is driven through a pair of intermeshing gears 200 mounted on the two snapping rolls.

The harvester unit 47 is provided with an inner gatherer chain 205, trained over a pair of fore and aft spaced sprockets 206, which receives power from the inner snapping roll shaft through a sprocket 207, a chain 208, and a sprocket 209 mounted on a longitudinally extending shaft 210, which it drives through a slip clutch 211. The shaft 210 is connected to the rear sprocket 206 through a pair of suitable bevel gears (not shown) disposed within a gear housing 212. The shaft 210 is journaled at opposite ends thereof, respectively, in the gear housing 212 and in a bearing 213 carried on the back plate 53 of the snapping unit.

An outer gatherer chain 215 is trained over upper and lower sprockets 216, the upper sprocket 216 being driven by a chain 208, trained over sprockets 207, 209 and also a sprocket 217, which is fixed to a shaft 218, journaled in the plate 53 and in a gear box 219, within which are suitable bevel gears for driving the upper gatherer chain sprockets 216.

The elevator chain 134 is driven through the lower sprocket 225 over which its is trained. The sprocket 225 is mounted on a shaft 226 journaled within the hubs 126. A pulley 227 is journaled on the shaft 226 and is connected thereto through a slip clutch 228. This clutch can be manually disconnected by means of a fork 229 pivotally connected by a bolt 230 to a lug fixed to the beam 26. The clutch 228 is optionally connected and disconnected by means of a manually operable lever 231 attached to the fork 229. It is desirable to temporarily stop the wagon elevator when the tractor is making a turn at the end of a row of corn, since the upper end of the wagon elevator swings away from the wagon during turns, which would result in a substantial loss of corn if the elevator were permitted to continue to run during the time the tractor is turning. The sprocket 227 is driven through a chain 235, which is driven by a sprocket 236 mounted on the transverse power shaft 190 adjacent the gear box 175.

Referring now more particularly to Figures 9 and 10, the implement can be assembled without a husking unit, for those operators who desire a corn harvester of minimum weight and cost. In such case, the husking box 72, together with its supporting pipe members 86, 92, are left off the machine, together with the wagon elevator which is used with the husking box. In the embodiment of Figure 9, the wagon elevator 125' is provided with a transversely extending conveyor trough 240 formed integral therewith, the inner end of the trough 240 being thus supported on the wagon elevator and carried on the supporting arms 128 which are fixed to the transverse beam 26. The outer end of the conveyor trough 240 is supported on a generally vertical leg 241 which is pivotally connected by a bolt 242 to a rearwardly extending arm 243, bolted at 88 to the supporting plate 89 which is welded to the beam 26. The pivot bolt 242 is substantially in transverse alignment with the axis of the hub 126 and thus the wagon elevator 125' and the conveyor trough 240 are swingable as a unitary structure about the substantially common axis of the bolt 242 and the hub 126. The outer end of the trough 240 is provided with a flared hopper 245, which catches the ears of corn from the ear conveyor 60. An auger 246 is disposed in the bottom of the trough 240 and is journaled on opposite ends, respectively, in bearings 247, 248 carried on the end walls of the hopper. The auger 246 is driven by a chain 250, which connects a sprocket 251 on the inner end of the shaft of the auger to a sprocket 252 on the extended end of the elevator drive shaft 226. Since this shaft is controlled by the clutch 228, the auger 246 as well as the elevator conveyor 134 can be stopped by means of the lever 231 while the implement is making a turn at the end of the field.

The conveyor trough 240 is prevented from twisting relative to the elevator 125' by means of a structure including a pair of arms 255, 256, which are rigidly mounted on a transversely disposed shaft 257, the latter being journaled at opposite ends thereof, respectively, on the arm 243 at its outer end and in a bracket 258 (see Figure 11) on one of the elevator supporting arms 128. The arms 255, 256 are rigidly connected, as by welding, to the shaft 257 and extend generally vertically therefrom, and at their upper ends, are connected to the auger trough 240 by means of a pair of short links 260. It is evident that this structure prevents any appreciable twisting of the conveyor trough, since the shaft 257 resists torsional stresses, but freely permits the elevator 125' and the conveyor trough 240 to swing about the transverse axis of the supporting bolt 242 and the hubs 126, which movement is accommodated by the shaft 257 rotated within its bearings.

Figure 1:
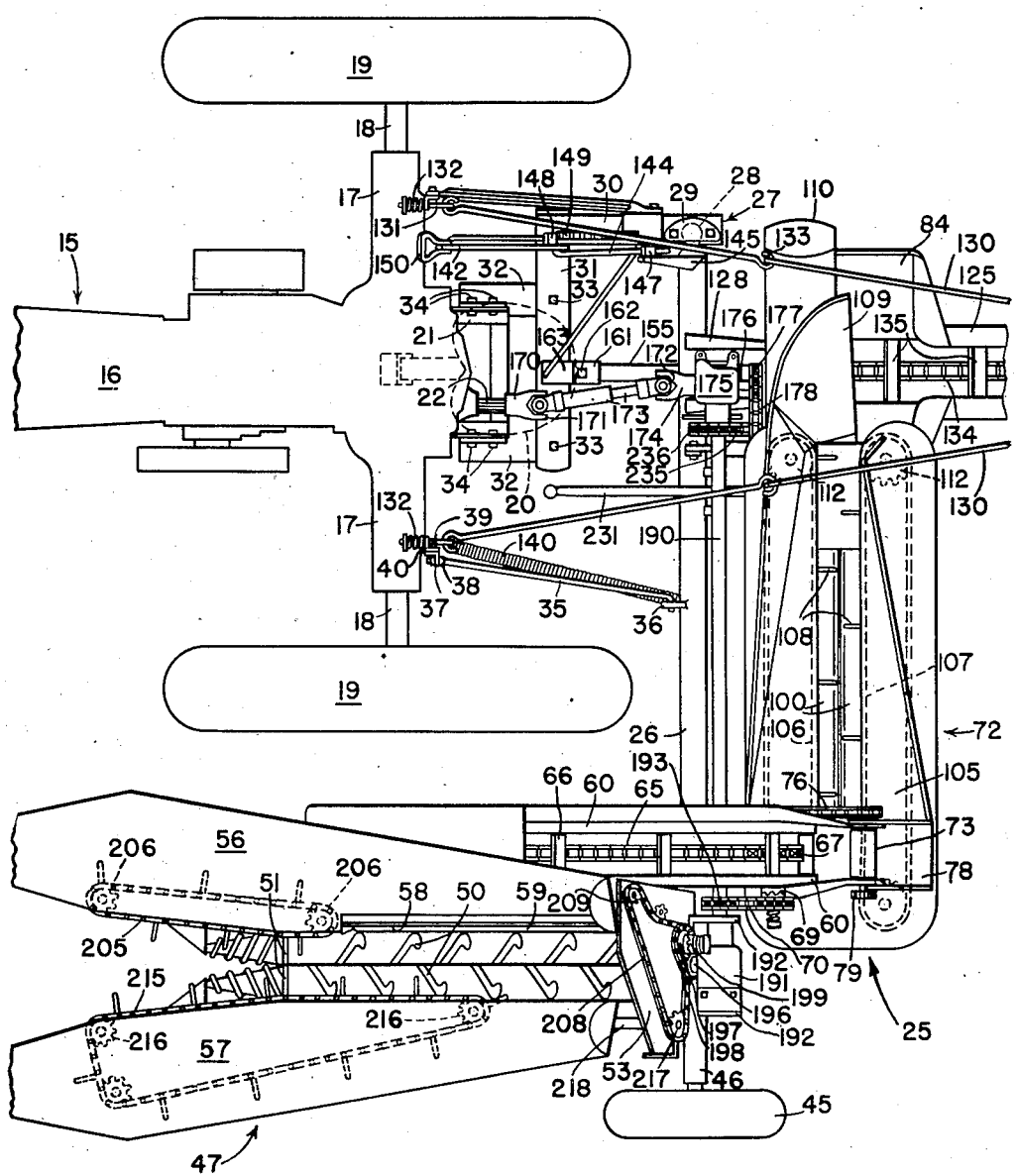

Any dirt, loose leaves, and the like which are carried to the trough by the ear conveyor 60, are separated from the ears of corn by means of a blast of air directed longitudinally of the auger trough 40 by means of a fan 261, which is rigidly supported over the trough 240 on the framework 262, which is rigidly carried on the beam 26, independent of the trough 240. The frame 262 comprises a pair of structural angle members 263, 264, which are bolted at their lower ends to the supporting plates 95, 141, rigidly welded to the beam 26. The structural members 263, 264 extend upwardly and are bent rearwardly, as at 265, and the members are braced against each other by means of a pair of cross braces 266, 267. A pair of transverse frame members 268, 269 interconnect the rearwardly extending horizontal portions 265 of the frame 262. The fan has an exhaust duct 270, which directs the blast of air toward the ears falling from the elevator 60, and the fan is driven by means of a V-belt 271, which is trained over a pulley 272 on the fan shaft and a driving pulley 273 mounted on the shaft 176 in place of the sprocket 177, as in the picker husker combination shown in Figures 1 and 2. The belt 271 is tightened when necessary by means of a belt tightening idler 274.

The inner end of the beam 26 is supported by a transport truck 280 when the implement is not connected to a tractor. The truck 280 comprises a generally vertical standard comprising a pair of parallel bars 281 interconnected by a rigid plate 282 and extending upwardly therefrom in juxtaposition to form a handle 283. The lower ends of the bars 281 are spaced on opposite sides of a supporting wheel 284 which is journaled for rotation on an axle 285, carried on the ends of the bars 281. A pair of arms 286 are rigidly fixed to the standard and are recessed to receive the beam 26 and to hold the latter when the truck 280 is substituted for the tractor. The standard 280 is retained against lateral tilting by means of a transversely extending link 287, which is swingably connected to the plate 282 and has a hooked end adapted to engage a suitable aperture 288 in the lower side of the outer elevator supporting arm 128. A second link 289 is swingably mounted on the handle 283 and is engageable in an aperture 290 in the end of the arm 145 rigidly connected to the beam 26. The upper end of the handle 283 is provided with a lug 291 rigidly fixed thereto, which is suitably apertured to receive a bolt 292 having a hook 293 on the end thereof, adapted to receive one of the interconnecting eyes 133 between the two portions of the tension rod 130, which holds the elevator 125'. Thus it is evident that the transport truck 280 holds the inner end of the beam 26 and maintains the harvesting unit 47 and elevator 125' in fixed angular relation to each other, whereby the elevator is maintained in raised position and the entire implement can be moved by hand on the two supporting wheels 284 and 45, and is stable at rest with the runners 55 resting on the ground. Obviously, the same transport truck 280 can be used regardless of whether the implement is provided with a husking box or with an aguer conveyor.

The implement can be laid upon the ground by unhooking the eye 133 from the hook 293 and lowering the elevator 125' to the ground, after which the lever 283 can be swung forwardly to lower the beam 26 until the bottom of the elevator rests upon the ground. The links 287, 289 can then be unhooked from the implement and the transport truck 280 is then free to be removed. The implement can thereafter be picked up once more by hooking the arms 286 under the beam 26 with the standard in a forwardly inclined position, then hooking the links 287, 289 to their respective points on the implement and raising the latter by swinging the lever 283 upwardly and securing the same by hooking the tension rod 130 thereto.

Referring now more particularly to Figures 12 and 13, the corn sheller is indicated in its entirety by reference numeral 300 and comprises a sheet metal housing 301 extending transversely behind the tractor and carried on the supporting arms 86, 92, which are fixed to the transverse beam 26 and extend rearwardly therefrom in laterally spaced relation. As in the case of the husker, the housing 301 is provided with a pair of apertured supporting plates 302, 303, which slidably receive the supporting arms 86 and 92, respectively, and are secured thereto by suitable cotter pins inserted through the holes 90, 97 on the arms 86, 92.

The sheller 300 is divided into two portions by means of a vertical partition or wall 304 to provide a shelling housing 305 and a cleaning unit 306. Within the shelling housing 305 is rotatably supported a shelling rotor 307, journaled at opposite ends thereof in the wall 304 and the outer partition of the housing. Beneath the shelling rotor is a screen 310, which is apertured as at 311 to permit the kernels of corn to drop therethrough out of the sheller housing 305, while retaining within the sheller housing the cobs and husks.

The ears of corn are delivered by the conveyor 60 to a chute 312, which guides the ears to an intake opening 313 at the outer end of the sheller housing 305. The sheller rotor 307 is driven from the power shaft 190 by means of a drive chain 314 which drives a sprocket 315 on the shaft 316 of the sheller rotor.

An auger conveyor 320 is rotatably disposed within a trough 321 within the sheller housing 305 and beneath the sheller screen 310, and serves to collect the kernels of corn that are shelled from the cobs by the sheller rotor 307 and which drop through the apertures 311 in the screen 310. The auger conveyor 320 is provided with a drive shaft 322 and is driven by means which will be described later, in such direction as to move the kernels of corn laterally inwardly within the trough 321. The husks and cobs are discharged from the sheller housing 305 through an aperture 324 in the upper portion of the wall 304 into the cleaning portion 306 of the sheller 300. The cleaning portion 306 extends laterally inwardly across the rear of the tractor from the wall 304 and is inclined upwardly from the wall 304 in order to clear the hopper 84 of the wagon elevator. An auger conveyor 325 is rotatably supported within the upper portion of the cleaning housing 306 and has a shaft 326 journaled at one end in a bearing 327 supported on the wall 304, and at the other end, the shaft 326 is journaled in the end wall 328 of the housing portion 306. Beneath the auger 325 is disposed a trough 329, which is provided with holes 330, adapted to pass any kernels of corn which are carried through the opening 324 with the cobs and husks. The beating action of the auger 325 upon the cobs and husks as the latter pass upwardly along the trough 329, effectively separates the kernels from the husks and then discharges the latter over a finger grate 331 at the discharge opening 332 in the upper end of the cleaning housing 306. Thus, the cobs and husks slide forwardly over the finger grate 331 and fall upon the ground, while a hood 333 extends over the finger grate to prevent the husks from being blown by the wind into the wagon elevator or toward the tractor operator.

In the lower portion of the cleaner housing 306 is disposed an auger conveyor 340, having a drive shaft 341 which is connected by a universal joint 342 with the inner end of the shaft 322 of the auger conveyor 320, from which the auger 340 receives its driving power. The shaft 322 of the auger 320 is driven at its outer end by means of a drive chain 342, driven from a sprocket 343 journaled on the shaft 316 and connected by a spring actuated clutch 344 to the pulley 315 which drives the rotor shaft 316. Thus, the kernels of corn are conveyed by the auger 320 and are delivered through an opening 345 in the lower portion of the wall 304, to the inclined auger 340, which conveys the kernels of corn upwardly and inwardly along a trough 346 in the bottom of the cleaner 306. The trough 346 terminates in spaced relation to the end wall 328 so that the kernels are discharged over the end of the trough 346 and fall upon an inclined chute 347, which is disposed beneath the trough 346 and discharges the kernels at its lower end into the hopper 84, from which the kernels are conveyed by the wagon elevator and deposited in the wagon behind the tractor, as in the case of the picker husker.

As the kernels fall from the upper end of the trough 346 to the chute 347, any dirt or chaff that may be mixed with the kernels is separated therefrom by means of a blast of air from a blower fan 350, directed by means of an exhaust duct 351 across the stream of falling kernels. The forward side 352 of the chute 347 is inclined upwardly to direct the air blast through the finger grate 331 to remove the cobs and husks therefrom. The fingers in the grate 331 are spaced close enough together to prevent cobs from falling into the chute 347, but permit kernels of corn to drop into the latter.

The husk and cob auger shaft 326 is driven at its upper end through a sprocket 353 by means of a chain 354 which receives power from a sprocket 355 on the shaft 341 of the corn auger 340. The fan 350 includes a rotor 356, the shaft of which is driven by a suitable V-belt from a pulley 357 on the upper end of the shaft 341.

We claim:

1. In combination with a tractor comprising a body carried on a pair of laterally spaced rear wheels, an implement comprising a transverse draft beam disposed behind said tractor and extending laterally beyond one side thereof, draft means supporting the inner end of said beam on the rear of said tractor and providing for angular movement of said beam relative to the tractor about a transverse axis, crop gathering means supported on the outer end of said beam and extending forwardly therefrom alongside the tractor body, and means connected between said beam and the rear end of said tractor between said wheels for angularly moving said beam to raise the forward end of said gathering means.

2. In combination with a tractor comprising a body carried on a pair of laterally spaced rear wheels, an implement comprising a transverse draft beam disposed behind said tractor and extending laterally beyond one side thereof, draft means supporting the inner end of said beam on the rear of said tractor body between said rear wheels, and providing for angular movement of said beam relative to the tractor about a transverse axis, ground engaging supporting means at the outer end of said beam, crop gathering means supported on said beam and extending forwardly along the outer side of one of said rear wheels, and means connected between said beam adjacent the inner end thereof and said draft means for applying a torsional force to said beam to raise the forward end of said gathering means.

3. In combination with a tractor comprising a body carried on a pair of laterally spaced rear wheels, an implement comprising a transverse draft beam disposed behind said tractor and extending laterally beyond one side thereof, draft means supporting the inner end of said beam on the rear of said tractor including a universal joint member providing for vertical swinging movement of said beam and for angular movement thereof about a transverse axis, a tension draft link swingably connected between said beam and said tractor in laterally spaced relation to said universal joint member and permitting said vertical swinging and said angular movements while restraining said beam from swinging horizontally rearwardly, crop gathering means supported on said beam outside of the planes of said rear tractor wheels and extending longitudinally of said beam, a wheel mounted on said beam outwardly of said rear tractor wheels for supporting said beam, a lever arm fixed to said beam between the planes of said rear tractor wheels and means connected with said lever arm for angularly moving said beam to raise and lower said gathering means.

4. In combination with a tractor comprising a body carried on a pair of laterally spaced wheels, a corn harvesting implement comprising a transverse draft beam disposed at the end of said tractor and extending laterally beyond one of said wheels, draft means supporting the inner end of said beam on said tractor between said wheels including universal joint means providing for vertical swinging movement of said beam and for angular movement thereof about the major axis thereof, a draft connection between said beam and said tractor disposed between said wheels in laterally spaced relation to said universal joint means permitting said vertical swinging and angular movements while restraining said beam from swinging horizontally, gatherer arms supported on said beam and extending along the outer side of one of said wheels, a wheel mounted on said beam outside of said arms for supporting said beam, a lever arm fixed to said beam between the planes of said tractor wheels, and means mounted on said tractor and connected with said lever arm for stressing said beam in torsion, for lifting said gatherer arms.

5. In combination with a tractor including a body carried on a pair of laterally spaced rear traction wheels, a corn picker comprising a draft beam disposed directly behind said wheels substantially parallel to the axis of the latter and extending laterally beyond one wheel, laterally spaced connections between the inner end of said beam and the rear of said tractor between said rear wheels, serving as the sole draft means for the implement, a ground wheel journaled at the outer ends of said beam for supporting the same, a gatherer frame fixed to said beam inwardly of said ground wheel and extending forwardly therefrom outside of said traction wheel, a pair of cooperative snapping rolls journaled in said frame and disposed longitudinally adjacent the outer side of said rear traction wheel, and an operator's support carried on said body between said traction wheels and directly laterally of said snapping rolls to provide the tractor operator with a clear view of said snapping rolls.

6. In combination with a tractor including a body carried on a pair of laterally spaced rear traction wheels, a corn picker comprising a draft beam disposed directly behind said wheels and extending laterally beyond one wheel, laterally spaced connections between the inner end of said beam and the rear of said tractor between said rear wheels, serving as the sole draft means for the implement, a single ground engaging supporting means at the outer end of said beam for solely supporting said outer end, a gatherer frame fixed to said beam and extending forwardly therefrom outside of the tractor wheel, an operator's seat mounted on the tractor body between said rear traction wheels, and a pair of longitudinally disposed cooperative snapping rolls journaled in said frame and inclined downwardly and forwardly in a position below and behind the extended axis of rotation of the adjacent traction wheel.

7. In combination with a tractor including a body carried on a pair of laterally spaced rear traction wheels, a corn picker comprising a draft beam disposed directly behind said wheels substantially parallel to the axis of the latter and extending laterally beyond one wheel, draft means supporting the inner end of said beam on the rear of said tractor including a universal joint means providing for vertical swinging movement of said beam and for angular movement thereof about a transverse axis, and a tension draft link swingably connected between said wheels in laterally spaced relation to said universal joint means permitting said vertical swinging and angular movements while restraining said beam from swinging horizontally, a gatherer frame fixed to said beam and extending forwardly therefrom outside of the adjacent tractor wheel, a ground wheel journaled at the outer end of said beam for solely supporting the same, a lever arm fixed to said beam adjacent said draft connections, means carried on said tractor and connected with said lever arm for stressing said beam in torsion to lift said frame, an operator's support carried on said body between said wheels, and a pair of cooperative snapping rolls journaled in said frame and disposed longitudinally adjacent the outer side of the adjacent tractor wheel and directly laterally of said operator's support whereby the operator, when positioned on said support, is afforded a clear view of said snapping rolls.

8. In combination with a tractor including a body carried on a pair of laterally spaced rear traction wheels, a corn picker comprising a draft beam disposed directly behind said wheels substantially parallel to the axis of the latter and extending laterally beyond one wheel, draft means supporting the inner end of said beam on the rear of said tractor including a universal joint means providing for vertical swinging movement of said beam and for angular movement thereof about a transverse axis, and a tension draft link swingably connected between said wheels in laterally spaced relation to said universal joint means permitting said vertical swinging and angular movements while restraining said beam from swinging horizontally, a gatherer frame fixed to said beam and extending forwardly therefrom outside of the adjacent tractor wheel, a ground wheel journaled at the outer end of said beam for solely supporting the same, a lever arm fixed to said beam adjacent said draft connections, means carried on said tractor and connected with said lever arm for stressing said beam in torsion to lift said frame, an operator's support carried on said body between said wheels, and a pair of longitudinally disposed cooperative snapping rolls journaled in said frame and inclined downwardly and forwardly in a position below and behind the extended axis of rotation of the adjacent traction wheel whereby the operator, when seated on said seat, is afforded a clear view of said snapping rolls.

9. In combination with a tractor having a pair of laterally spaced rear traction wheels, a corn picker comprising a transverse draft beam disposed behind said tractor and extending laterally beyond one of said wheels, draft means supporting the inner end of said draft beam on said tractor between said wheels, including universal joint means providing for vertical swinging movement of said beam and for angular movement thereof about a transverse axis, a draft connection between said beam and said tractor between said wheels in laterally spaced relation to said universal joint means permitting said vertical swinging and angular movements while restraining said beam from swinging horizontally rearwardly, gatherers fixed to said beam and extending forwardly therefrom along the outer side of one of said traction wheels, a ground wheel mounted on said beam beyond said gatherers for supporting said beam, a pair of snapping rolls journaled in said gatherers, a conveyor for receiving ears of corn from said snapping rolls and conveying them rearwardly, a pair of laterally spaced supports fixed to said beam, a transversely disposed trough carried on said supports and adapted to receive said ears from said conveyor, a wagon elevator carried on said beam adjacent the inner end thereof, conveyor means in said trough for moving said ears through the latter and delivering them to said elevator, and adjustable means connecting said tractor and said beam between said tractor wheels for angularly moving said beam about said transverse axis to raise said gatherers above the ground.

10. In combination with a tractor having a pair of laterally spaced rear traction wheels, a corn picker comprising a transverse draft beam disposed behind said tractor and extending laterally beyond one of said wheels, draft means supporting the inner end of said draft beam on said tractor between said wheels, including universal joint means providing for vertical swinging movement of said beam and for angular movement thereof about a transverse axis, a draft connection between said beam and said tractor between said wheels in laterally spaced relation to said universal joint means permitting said vertical swinging and angular movements while restraining said beam from swinging horizontally rearwardly, gatherers fixed to said beam and extending forwardly therefrom along the outer side of one of said traction wheels, a ground wheel mounted on said beam beyond said gatherers for supporting said beam, a pair of snapping rolls journaled in said gatherers, a conveyor for receiving ears of corn from said snapping rolls and conveying them rearwardly, a pair of laterally spaced supports fixed to said beam, a transversely disposed husking box disposed to receive ears from said conveyor and mounted on said laterally spaced supports, husking rolls journaled in said box, and means for angularly moving said beam to raise and lower said gatherers.

11. In combination with a tractor having laterally spaced rear traction wheels, a transverse draft beam disposed behind said tractor and extending laterally beyond one of said wheels, a draft connection between the inner end of said beam and said tractor comprising a universal joint providing for vertical swinging movement and angular movement of said beam about the major axis thereof, a draft link connected between said beam and said tractor for restraining said beam from swinging rearwardly, a harvesting device fixed to said beam outwardly of one of said traction wheels, a ground wheel for supporting the outer end of said beam, an arm fixed to said beam adjacent said universal joint, means connected with said arm to move said beam angularly to raise said harvesting device, a pair of laterally spaced arms fixed to said beam, a crop treating device mounted on said arms and adapted to receive crops from said harvesting device, a pair of laterally spaced arms extending rearwardly from said beam and fixed rigidly thereto adjacent the inner end of said beam, and a crop receiving device carried on said last mentioned arms for rereiving crops from said crop treating device.

12. In combination with a tractor having laterally spaced rear traction wheels, a transverse draft beam disposed behind said tractor and extending laterally beyond one of said wheels, a draft connection between the inner end of said beam and said tractor comprising a universal joint providing for vertical swinging movement and angular movement of said beam about the major axis thereof, a draft link connected between said beam and said tractor for restraining said beam from swinging rearwardly, gatherer arms fixed to said beam and extending forwardly therefrom adjacent the outer side of one of said traction wheels, a ground wheel for supporting the outer end of said beam, a lifting arm fixed to said beam, means connected to said arm to stress said beam in torsion to lift said gatherer arms, a pair of laterally spaced, rearwardly extending brackets fixed to said beam, a husking box mounted on said brackets and disposed generally parallel to said beam with the outer end disposed to receive ears of corn from conveyor means on said gatherer arms, husking rolls journaled in said husking box, a pair of arms fixed to said beam adjacent the inner end and extending rearwardly therefrom, a wagon elevator mounted between said arms by means providing for vertical swinging movement in a longitudinally extending plane, and a hopper on said elevator for receiving husked ears from the inner end of said husking box.

13. In combination with a tractor having a pair of laterally spaced rear traction wheels, a draft beam disposed transversely behind said tractor and extending laterally outwardly of one of said wheels, draft means supporting said beam on said tractor providing for angular movement of said beam about its major axis, a harvesting unit mounted on said beam and extending forwardly therefrom outside of said one tractor wheel, a conveyor trough disposed transversely behind said tractor along said beam, one end of said conveyor being positioned to receive crops from said harvester unit, a bracket fixed to said beam for supporting said one end of said conveyor, a wagon elevator disposed to receive crops from the other end of said conveyor trough and extending rearwardly from said beam, a bracket fixed to said beam on which said elevator is mounted, and means for supporting said other end of said trough on said elevator.

14. In combination with a tractor having a pair of laterally spaced rear traction wheels, a draft beam disposed transversely behind said tractor and extending laterally outwardly of one of said wheels, draft means supporting said beam on said tractor providing for angular movement of said beam about its major axis, a harvesting unit mounted on said beam and extending forwardly therefrom outside of said one tractor wheel, means for moving said beam angularly to raise and lower said harvester unit, a wagon elevator disposed adjacent the inner end of said beam between said tractor wheels, bracket means mounted on said beam on which said elevator is mounted providing for swinging movement of said elevator in a generally vertical plane relative to said beam, a conveyor trough having one end rigidly fixed to said elevator and supported thereon, said trough extending transversely along said beam with its outer end positioned to receive crops from said harvester unit, means for swingably connecting said outer end of said trough to said beam, and stop means for limiting the extent of swinging movement of said trough and elevator.

15. In combination with a tractor having a pair of laterally spaced rear traction wheels, a draft beam disposed transversely behind said tractor and extending laterally outwardly of one of said wheels, draft means supporting said beam on said tractor providing for angular movement of said beam about its major axis, a harvesting unit mounted on said beam and extending forwardly therefrom outside of said one tractor wheel, means for moving said beam angularly to raise and lower said harvester unit, a wagon elevator disposed adjacent the inner end of said beam between said tractor wheels, bracket means fixed to said beam on which said elevator is mounted by means providing for swinging movement of said elevator in a generally vertical plane relative to said beam, a conveyor trough having one end rigidly fixed to said elevator and supported thereon, said trough extending transversely along said beam with its outer end positioned to receive crops from said harvester unit, a bracket fixed to said beam adjacent said opposite end of the trough, means for pivotally connecting said trough to said bracket whereby said trough and said elevator are vertically swingable as a unit about a transverse axis, a tension member connecting said elevator and said tractor for limiting the extent of swinging movement, a shaft rotatably mounted on said beam substantially parallel to the axis of pivotal movement of said elevator and trough, a pair of laterally spaced arms fixed to said shaft, and means connecting each of said arms with said unitary elevator and trough structure to brace the latter against twisting.

16. In combination with a tractor having a pair of laterally spaced rear traction wheels, a draft beam disposed transversely behind said tractor and extending laterally outwardly of one of said wheels, draft means supporting said beam on said tractor providing for angular movement of said beam about its major axis, a harvesting unit mounted on said beam and extending forwardly therefrom outside of said one tractor wheel, means for moving said beam angularly to raise and lower said harvester unit, a wagon elevator disposed adjacent the inner end of said beam between said tractor wheels, bracket means mounted on said beam on which said elevator is mounted providing for swinging movement of said elevator in a generally vertical plane relative to said beam, a conveyor trough having one end rigidly fixed to said elevator and supported thereon, said trough extending transversely along said beam with its outer end positioned to receive crops from said harvester unit, means for swingably connecting said outer end of said trough to said beam, stop means for limiting the extent of swinging movement of said trough and elevator, a rigid frame fixed to said beam and extending upwardly over said trough, and a fan fixedly mounted on said frame and adapted to direct a blast of air into said trough.

17. In combination with a tractor having a pair of laterally spaced rear wheels, a transversely disposed draft beam behind said tractor and extending laterally beyond one of said wheels, means for supporting said beam on said tractor including a universal joint disposed coaxially of said beam and mounted on said tractor between said rear wheels, means for supporting the outer end of said beam, harvesting means fixed to said beam, means for angularly moving said beam about its major axis to raise said harvesting means, a crop receiving device mounted on said beam between said tractor wheels, a wagon drawbar extending under said crop receiving device, means intermediate the ends of said drawbar for supporting the same on said beam, detachable means at the forward end of said drawbar for coupling the same to the tractor, and means at the rear end of said drawbar for coupling the same to a wagon.

18. An implement adapted for connection with a tractor comprising a transverse beam, draft means for supporting the inner end of said beam on a tractor between the two rear wheels, a ground wheel journaled at the outer end of said beam, a harvesting unit fixed to said beam and extending forwardly therefrom, and a transport truck for supporting the inner end of said beam when the same is not connected with a tractor, comprising a wheel supported frame having means for receiving said beam, and means securing said beam to said truck for preventing rotation of the beam relative to the truck.

19. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, and a transport truck for supporting the inner end of said beam when the same is not connected with a tractor, comprising a wheel supported frame having means for receiving said beam, and link means for detachably connecting said arm to said frame to prevent rocking of said beam.

20. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, and a transport truck for supporting the inner end of said beam when the same is not connected with a tractor, comprising a vertically disposed standard having receiving means for supporting said beam, a single wheel journaled on said standard on which said frame is carried, link means for detachably connecting said arm to said standard to prevent rocking of said beam, and link means attached to said standard and extending laterally to a point of connection with said beam for holding said standard against tilting laterally.

21. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, a wagon elevator mounted on said beam by means providing for vertical swinging movement relative thereto, and a transport truck for supporting the inner end of said beam when the same is not connected with a tractor, comprising a vertically disposed standard having means for receiving and supporting said beam, a single wheel journaled on said standard on which said frame is carried, link means detachably connecting said arm to said standard to prevent rocking of said beam relative thereto, link means detachably connecting said standard with a point on said beam spaced laterally therefrom for holding said standard against tilting laterally, and means for detachably connecting said elevator with said standard for holding the elevator in a raised position.

22. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, a wagon elevator mounted on said beam by means providing for vertical swinging movement relative thereto, a tension member adapted to be connected to the tractor to hold the elevator in raised position, and a transport truck for supporting the inner end of said beam when the same is not connected with the tractor, comprising a vertical standard supported on a single ground wheel and provided with recessed arm means adapted to hook under said beam and a handle for raising said beam and standard about said wheel as a fulcrum, link means detachably connecting said standard with said arm fixed on said beam to prevent rocking of the latter, link means detachably connecting said standard with a point on said beam spaced laterally therefrom for holding said standard against lateral tilting, and means for connecting said tension member with said handle to hold said elevator in raised position.

23. In a corn harvester having a gatherer including a pair of cooperative snapping rolls, an ear conveyor disposed alongside said rolls, a side wall between said rolls and said conveyor, said side wall being provided with an opening through which snapped ears pass to said conveyor, a baffle adjustably disposed within said opening and adapted for optionally decreasing the size of said opening, and means for rigidly fixing said baffle in adjusted position.

24. In a corn harvester having a gatherer including a pair of cooperative snapping rolls, a pair of side walls disposed along opposite sides of said rolls, said walls being curved outwardly at their upper edges to guide corn stalks into said rolls during operation, one of said walls having an opening adjacent the rear ends of said rolls through which snapped ears are discharged, a baffle disposed to lie flush with said wall over the upper portion of said opening and shiftable relative thereto to optionally decrease the height of the opening, and means for securing said baffle in adjusted position.

25. In combination with a tractor having a pair of laterally spaced rear traction wheels, a transverse beam disposed behind said tractor and extending laterally beyond one of said wheels, draft means including a universal joint for supporting said beam on said tractor between said wheels, additional draft means connecting said beam and said tractor between the wheels, a supporting wheel journaled adjacent the outer end of said beam, snapping mechanism fixed to said beam and extending forwardly along the outer side of said tractor wheel, a shelling cylinder mounted on said beam and disposed transversely of the tractor with one end positioned to receive ears from said snapping mechanism, a cleaning cage disposed at the opposite end of said cylinder to receive cobs and husks from the latter, said cage being inclined upwardly and laterally away from said cylinder, conveying means in said cage to move said cobs and husks laterally to a discharge opening at the other end of the cage, a hopper disposed under the upper end of said cage, and a wagon elevator mounted on said beam and adapted to receive kernels of corn from said hopper.

26. In combination with a tractor having a pair of laterally spaced rear traction wheels, a transverse beam disposed behind said tractor and extending laterally beyond one of said wheels, draft means including a universal joint for supporting said beam on said tractor between said wheels, additional draft means connecting said beam and said tractor between the wheels, a supporting wheel journaled adjacent the outer end of said beam, snapping mechanism fixed to said beam and extending forwardly along the outer side of said tractor wheel, a shelling cylinder mounted on said beam and disposed transversely of the tractor with one end positioned to receive ears from said snapping mechanism, an auger conveyor beneath said cylinder to receive kernels therefrom and convey the same laterally, a cleaning cage disposed at the opposite end of said cylinder to receive cobs and husks from the latter, said cage being inclined upwardly and laterally away from said cylinder, conveying means in said cage to move said cobs and husks laterally to a discharge opening at the other end of the cage, a hopper disposed under the upper end of said cage, an auger conveyor disposed beneath said cleaning cage to receive kernels therefrom and inclined with said cage, universal joint means interconnecting said auger conveyors, driving means connected to one end of one of said augers for driving both augers to convey kernels to said hopper, and a wagon elevator mounted on said beam and adapted to receive kernels of corn from said hopper.

27. A harvester comprising a transverse draft beam, a harvesting mechanism at one end of said beam and extending forwardly therefrom, means for supporting said beam for rocking movement to raise and lower said harvesting mechanism, a lever connected to the other end of said beam for rocking the latter, a pair of laterally spaced arms fixed to said beam and extending rearwardly therefrom, a crop treating device disposed to receive crop from said harvesting mechanism and detachably supported on said arms whereby said device may be readily detached from said arms for replacement purposes.

28. A harvester comprising a transverse draft beam, a harvesting mechanism at one end of said beam and extending forwardly therefrom, means for supporting said beam for rocking movement to raise and lower said harvesting mechanism, a pair of laterally spaced arms fixed to said beam and extending rearwardly therefrom, a crop treating device disposed to receive crop from said harvesting mechanism and having a pair of bearing brackets spaced to receive said arms, respectively, by sliding thereover, and detachable locking means for locking said brackets on said arms whereby said device may be readily removed from said arms upon detachment of said locking means for replacement purposes.

29. A harvester comprising a transverse draft beam, a harvesting mechanism at one end of said beam and extending forwardly therefrom, means for supporting said beam for rocking movement to raise and lower said harvesting mechanism, a pair of laterally spaced arms fixed to said beams and extending rearwardly therefrom, a crop conveyor disposed parallel to said beam in position to receive crop from said harvesting mechanism and having a pair of spaced brackets pivoted respectively to said arms, a torque shaft journaled at opposite ends on said arms, said shaft having an arm on each end, and link means connecting said shaft arms to said brackets, respectively.

30. In an implement, a supporting beam having spaced arms, a trough disposed parallel to said beam and having spaced brackets pivoted to said arms, respectively, a torque shaft journaled at opposite ends on said arms, said shaft having an arm on each end, and link means connecting said shaft arms to said brackets, respectively.

31. An agricultural implement adapted to be supported on the rear of a tractor and comprising a frame having a pair of laterally spaced draft devices adjacent one end of said frame, adapted to be secured to the rear end of the tractor for supporting said one end of said frame solely on the rear end of the tractor and holding said frame transversely of the direction of travel and extending in laterally offset position beyond one side of the tractor, and operating mechanism mounted on the lateral extension outwardly of the side of the tractor, said frame having sufficient rigidity and stiffness to transmit draft force to said outwardly mounted mechanism without external draft connections at the side of the tractor.

32. An agricultural implement adapted to be supported on the rear of a tractor and comprising a frame having a pair of laterally spaced draft connections adjacent one end of said frame adapted to be secured to the rear end of the tractor body between the rear tractor wheels, for supporting one end of said frame solely on the rear end of the tractor and holding said frame transversely of the direction of travel and extending in laterally offset position beyond one side of the tractor, ground engaging supporting means for the outer end of said frame, and operating mechanism mounted on the lateral extension of said frame, outwardly of the side of the tractor, said frame having sufficient rigidity and stiffness to transmit draft force to the outer end thereof from said draft devices between the tractor wheels without external draft connections at the side of the tractor.

33. An agricultural implement adapted to be supported on the rear of a tractor and comprising an L-shaped rigid frame including a transverse portion normally disposed directly at the rear of the tractor and a longitudinal portion at one side of the tractor and offset outwardly from the side of the latter, draft means for supporting the end of said transverse portion on the rear of the tractor entirely within the planes of the rear tractor wheels and comprising the sole draft connections for said implement and the sole support for said one end of said frame, said draft means providing for vertical movement of said longitudinal frame portion relative to the tractor but preventing rearward movement thereof, and a ground wheel journaled at the outer end of said transverse frame portion for supporting the latter, said transverse frame portion having sufficient stiffness under torsional stress to support said longitudinal frame portion clear of the ground.

34. An agricultural implement adapted to be supported on the rear of a tractor and comprising an L-shaped rigid frame including a transverse portion normally disposed directly at the rear of the tractor and a longitudinal portion at one side of the tractor and offset outwardly from the side of the latter, draft means for supporting the end of said transverse portion on the rear of the tractor entirely within the planes of the rear tractor wheels and comprising the sole draft connections for said implement, said draft means providing for vertical movement of said longitudinal frame portion relative to the tractor and for angular movement about the major axis of said transverse frame portion but preventing rearward movement thereof, a ground wheel journaled at the outer end of said transverse portion, and means connected to said transverse portion adjacent said draft means for rocking the frame angularly about its axis to raise and lower said longitudinal frame portion.

35. An agricultural implement adapted to be supported on the rear of a tractor and comprising a frame, draft means for connecting said frame to the tractor, and a drawbar mounted on said frame and extending generally fore and aft, said drawbar having means at its forward end for detachably coupling the same to the tractor and means adjacent its rear end for coupling the same to a wagon.

36. An agricultural implement adapted to be supported on the rear of a tractor and comprising a frame, draft means for connecting said frame to the tractor, and a drawbar having means intermediate its ends for supporting the same on said implement frame providing for movement relative thereto, means at its forward end for detachably coupling the same to the tractor and means adjacent its rear end for coupling the same to a wagon.

37. An agricultural implement comprising a frame, draft means for connecting said frame to a tractor, and a separate drawbar having means at one end for coupling to the tractor, means at the other end for coupling to a wagon, and a pair of generally vertical links for swingably mounting said drawbar on said implement frame.

38. An agricultural implement comprising a frame, draft means for connecting said frame to a tractor, and a separate drawbar having means at one end for coupling to the tractor, means at the other end for coupling to a wagon, and a pair of generally vertical links depending from said frame and pivotally connected to the intermediate portion of said drawbar providing for supporting the latter on said implement frame for vertical swinging movement relative thereto.

39. An implement adapted for connection with a tractor comprising a frame, draft means for supporting one end of said frame on the tractor, ground engaging means for supporting the opposite end of said frame, and a detachable transport truck for supporting the inner end of said frame when the same is not connected with a tractor, comprising a standard mounted on a wheel and having recessed arm means adapted to hook under said frame and a handle for raising said frame and standard about said wheel as a fulcrum.

40. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, and a transport truck for supporting the inner end of said beam when the same is not connected with a tractor, comprising a wheel supported frame having recessed means adapted to hook under said beam, a handle for raising said truck frame and said beam, and link means connected to said truck frame for detachably connecting the latter to said raising arm on said beam to prevent rocking of the latter during transport.

41. An implement adapted for connection with a tractor comprising a transverse beam, draft means for supporting the inner end of said beam on a tractor between the two rear wheels, said draft means providing for rocking movement of said beam about its major axis, a ground wheel journaled at the outer end of said beam, a harvesting unit fixed to said beam and extending forwardly therefrom, means for rocking said beam to raise and lower said harvesting unit including an arm fixed to said beam, and a transport truck for supporting the inner end of said beam when the same is not connected with a tractor, comprising a standard having recessed means adapted to hook under said beam adjacent said draft means when the inner end of said beam is resting on the ground and the standard is inclined to the ground, a single wheel means journaled on said standard, a handle for raising said standard and said beam about said wheel means as a fulcrum, and link means attached to said standard for detachably connecting the latter to said arm to prevent rocking of said beam and to a point of connection with said beam spaced laterally from said standard to hold the latter from tilting laterally.

42. An agricultural implement comprising a wheel supported frame, an ear harvesting mechanism supported thereon, a shelling cylinder mounted on said frame and disposed to receive ears from said mechanism, an auger conveyor beneath said cylinder to receive kernels therefrom and convey the same longitudinally of said cylinder, a cleaning cage disposed at the end of said cylinder to receive cobs and husks from the latter, said cage being inclined upwardly therefrom, conveying means in said cage to move the material to the other end of the latter, a hopper disposed under the upper end of said cage, an auger conveyor disposed beneath said cage to receive kernels therefrom and inclined with said cage, universal joint means interconnecting said auger conveyors, and driving means connected to one end of one of said augers for driving both augers to convey kernels to said hopper.

43. In an agricultural implement of the class described, a shelling cylinder having an opening adjacent one end for receiving ears, a cleaning cage disposed at the opposite end of said cylinder to receive cobs and husks therefrom, an auger conveyor in said cleaning cage to move the material to the opposite end of the cleaning cage, the latter being inclined upwardly away from said shelling cylinder, a grain auger conveyor beneath said shelling cylinder to receive kernels therefrom, an inclined trough beneath said cleaning cage to receive kernels therefrom, a grain auger disposed in said trough, universal joint means connecting said grain augers, means for driving one of said grain augers, and a hopper beneath the outer end of said grain auger to receive kernels therefrom.

WILBUR J. COULTAS.
RUSSELL L. DORT.